United States Patent
Jing et al.

(10) Patent No.: US 10,333,949 B1
(45) Date of Patent: Jun. 25, 2019

(54) PROACTIVE PROTECTION OF MOBILE OPERATING SYSTEM MALWARE VIA BLOCKING OF INFECTION VECTOR

(71) Applicant: Symantec Corporation, Mountain View, CA (US)

(72) Inventors: Rui Jing, Los Angeles, CA (US); Joseph Chen, Los Angeles, CA (US); Yuan Liu, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 268 days.

(21) Appl. No.: 15/070,468

(22) Filed: Mar. 15, 2016

(51) Int. Cl.
  *H04L 29/06* (2006.01)
  *G06F 21/60* (2013.01)

(52) U.S. Cl.
  CPC ........ *H04L 63/1416* (2013.01); *H04L 63/145* (2013.01)

(58) Field of Classification Search
  CPC ... H04L 63/1416; H04L 63/145; H04L 63/02; H04L 63/20; G06F 21/55; G06F 21/556; G06F 21/552; G06F 21/554; G06F 21/57
  USPC .................................................. 726/23–25
  See application file for complete search history.

(56) References Cited

U.S. PATENT DOCUMENTS

| | | | | |
|---|---|---|---|---|
| 9,077,756 B1* | 7/2015 | FitzGerald | ............... | H04L 63/20 |
| 2008/0196104 A1* | 8/2008 | Tuvell | ..................... | H04L 51/12 726/24 |
| 2009/0217375 A1* | 8/2009 | Joosten | ................. | G06F 21/575 726/19 |
| 2011/0197280 A1* | 8/2011 | Young | .................... | G06F 21/552 726/24 |
| 2012/0240233 A1* | 9/2012 | Loman | .................... | G06F 21/51 726/24 |
| 2013/0160126 A1* | 6/2013 | Kapoor | ................. | G06F 21/568 726/24 |
| 2013/0185799 A1* | 7/2013 | Pfeifer | .................... | G06F 21/57 726/24 |
| 2013/0227636 A1* | 8/2013 | Bettini | .................. | H04W 4/001 726/1 |
| 2013/0247187 A1* | 9/2013 | Hsiao | .................... | G06F 21/552 726/22 |
| 2014/0359768 A1* | 12/2014 | Miliefsky | ............... | H04L 63/20 726/23 |

(Continued)

OTHER PUBLICATIONS

Saman Zonouz et al, Secloud: A Cloud-based Comprehensive and Lightweight Security Solution for Smartphones, Elsevier Ltd., 2013.*

(Continued)

*Primary Examiner* — Shanto Abedin (74) *Attorney, Agent, or Firm* — Holland & Hart LLP (57) ABSTRACT

The present disclosure relates to systems and methods for blocking an infection vector. In some embodiments, a method may include detecting, at a first device, a synchronization event with a second device, the first device and the second device operating with a proprietary mobile operating system. In some examples, the method may include recognizing, by the first device, that the first device is attempting to send a data package to the second device, and identifying the data package as malware. The method may further include blocking the data package from being received at the second device based at least in part on the identifying.

16 Claims, 7 Drawing Sheets

(56) References Cited

U.S. PATENT DOCUMENTS

| | | | |
|---|---|---|---|
| 2015/0261954 A1* | 9/2015 | Xue | G06F 21/554 |
| | | | 726/23 |
| 2016/0162269 A1* | 6/2016 | Pogorelik | G06F 8/61 |
| | | | 726/25 |
| 2016/0205125 A1* | 7/2016 | Kim | H04L 63/1416 |
| | | | 726/23 |
| 2016/0323243 A1* | 11/2016 | LeVasseur | G06N 99/005 |

OTHER PUBLICATIONS

G. Delac et al, Emerging Security Threats for Mobile Platforms, pp. 1468-1473, MIPRO, 2011.*
http://desowin.org/usbpcap/.
http://freeusbanalyzer.com/.
https:/wiki.wireshark.org/CaptureSetup/USB.
http://tjworld.net/wiki/Linux/Ubuntu/USBmonitoring.

* cited by examiner

PROACTIVE PROTECTION OF MOBILE OPERATING SYSTEM MALWARE VIA BLOCKING OF INFECTION VECTOR

BACKGROUND

As mobile devices and other computing devices continue to advance, so have malware attacks between mobile devices and personal computing devices. Malware attackers have begun to take advantage of connectivity between mobile devices and personal computing devices in order to install malicious applications without the mobile device users' knowledge. Some mobile operating systems may be limited in their ability to support anti-malware software due to their limited communication with other applications, making these attacks via mobile device and personal computing device connections more difficult to identify and/or prevent.

Because of these malicious attacks, a need exists for a system and methods to proactively protect mobile devices from malware attacks via connections between the mobile devices and personal computing devices. Accordingly, the present systems, methods, and techniques address these and other problems.

SUMMARY

Existing anti-malware software is generally not available for certain proprietary mobile operating systems, such as, for example, iOS (originally iPhone Operating System). iOS may have limited communication with other applications, such that identification of malware attacks may be difficult. Known attacks against iOS, such as Wirelurker and Operation PAWN storm malware programs, may take advantage of connectivity between devices running iOS and personal computers (PC) or Macintosh computers (Mac) by reversing the communication protocol used between iTunes and the iOS devices. This may allow for installation of provision profiles onto the target iOS device, even where the mobile device is not jail-broken, or may allow for installation of malicious developer signed or corporate signed applications. In some cases the iOS mobile device may provide a prompt to the user asking whether to trust an installed provision profile, but this prompt protocol may be bypassed. For example, Wirelurker may automate generation of malicious iOS applications through binary file replacement, and may install third-party applications on non-jailbroken iOS mobile devices through enterprise provisioning.

The present systems, methods, and techniques are designed to provide proactive protection of iOS malware via blocking infection vectors (malware). This proactive protection allows for identification and blocking of malicious provision profiles and application installations from a computing device to a mobile device, even while the installations are occurring.

Methods for blocking an infection vector are disclosed. In some embodiments, the method may include detecting, at a first device, a synchronization event with a second device, the first device and the second device operating with a proprietary mobile operating system (OS). In some examples, the method may include recognizing, by the first device, that the first device is attempting to send a data package to the second device, and identifying the data package as malware. The method may further include blocking the data package from being received at the second device based at least in part on the identifying.

In some embodiments, the detecting the synchronization event may include detecting a universal serial bus (USB) connection between the first device and the second device.

In some embodiments, the identifying the data package as malware may include extracting one or more characteristic of the data package, and querying a backend server based at least in part on the extracted one or more characteristic.

In some embodiments, the extracted one or more characteristic of the data package may include an application bundle identifier (application bundle ID), or a proprietary mobile operating system application archive (.ipa) file, or certification data, or a provision profile, or a combination thereof.

In some embodiments, the detecting the synchronization event may include detecting, by the first device, a Wi-Fi connection with the second device.

In some embodiments, the identifying the data package as malware may include extracting one or more characteristic of a process by which the first device is attempting to send the data package to the second device, and comparing the extracted one or more characteristic with one or more of a reputation, or a signer, or a known behavior, or a whitelist, or a blacklist, or a combination thereof.

In some embodiments, the first device may include a computing device, and the second device may include a mobile device.

In some embodiments, the recognizing that the first device is attempting to send the data package to the second device may include recognizing that the first device is attempting one or more of a path configuration, or an application installation, or an installation confirmation, or an application removal, or an application dump, or a data backup, or a provision profile installation, or a provision profile remove, or a provision profile list, or a combination thereof.

An apparatus for detecting malware is also disclosed. In some embodiments, the apparatus may include a processor and a memory in electronic communication with the processor. The memory may store instructions executable by the processor to: detect, at a first device, a synchronization event with a second device, the first device and the second device operating with a proprietary mobile operating system (OS); recognize, by the first device, that the first device is attempting to send a data package to the second device; identify the data package as malware; and block the data package from being received at the second device based at least in part on the identifying.

A non-transitory computer-readable storage medium storing computer executable instructions is also disclosed. In some embodiments, the computer executable instructions may be executed by a processor to cause the processor to perform the steps of: detecting, at a first device, a synchronization event with a second device, the first device and the second device operating with a proprietary mobile operating system (OS); recognizing, by the first device, that the first device is attempting to send a data package to the second device; identifying the data package as malware; and blocking the data package from being received at the second device based at least in part on the identifying.

Features from any of the above-mentioned or below-described embodiments may be used in combination with one another in accordance with the general principles described here. These and other embodiments, features, and advantages will be more fully understood upon reading the following detailed description in conjunction with the accompanying drawings and claims. The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

While the embodiments described here are susceptible to various modifications and alternative forms, embodiments have been shown by way of example in the drawings and will be described in detail. However, the exemplary embodiments described here are not intended to be limited to the particular forms disclosed or to limit other forms disclosed and/or undisclosed. Rather, this disclosure covers all modifications, equivalents, and/or alternatives.

DETAILED DESCRIPTION

In some embodiments, the present systems, methods, and techniques include detecting a synchronization event between a first personal computing device and a second mobile device, recognizing an attempt by the first personal computing device to send a data package to the second mobile device, identifying the data package as malware, and blocking the data package from being received at the second mobile device. The detecting and identifying may be run on the first personal computing device or on the second mobile device in various embodiments, but are performed on the first personal computing device in preferred embodiments. The synchronization event may include establishment of a Wi-Fi or USB connection between the first device and the second device, and the method for identifying the data package as malware may be specific to the mode of connectivity between the two devices, or may be generally applicable to either mode of connectivity.

In some examples, a USB connection, for example established for charging or synchronization purposes, between the first computing device—such as a PC or Mac computer—and the second mobile device may be detected at the first computing device. The PC/Mac may further detect that the PC/Mac is attempting to transmit a data package to the mobile device via the USB connection. The data package may represent an attempt at a malware attack, and the PC/Mac may accordingly extract one or more characteristic of the data package in order to identify the data package as malware. Possible characteristics of the data package may include an application bundle identifier (application bundle ID), or a proprietary mobile operating system application archive (.ipa) file, or certification data, or a provision profile, or some combination. In some examples, these one or more extracted data package characteristics may be communicated to a backend server to query the server as to whether the data package is malicious. If the backend server confirms that the data package is malicious, the PC/Mac may block the installation, dropping the data package attempted to be sent from the PC/Mac to the mobile device.

In other examples, a Wi-Fi connection, again established for synchronization purposes, may be identified between the mobile device and the PC/Mac. Wi-Fi connections are often encrypted, such that extracting one or more characteristic of a data package communicated across the Wi-Fi connection from the PC/Mac to the mobile device may be more difficult. Accordingly, in some examples, the PC/Mac may instead trace back the process by which the PC/Mac is communicating with the mobile device. The traced process may then be compared with one or more of a reputation, or a signer, or a known behavior, or a whitelist, or a blacklist, or any combination thereof, to determine whether the process indicates that the data package is malware. Again, if the comparison of the characteristics of the traced process is identified as malware, the data package may be blocked and dropped before installation on the mobile device.

Figure 1:
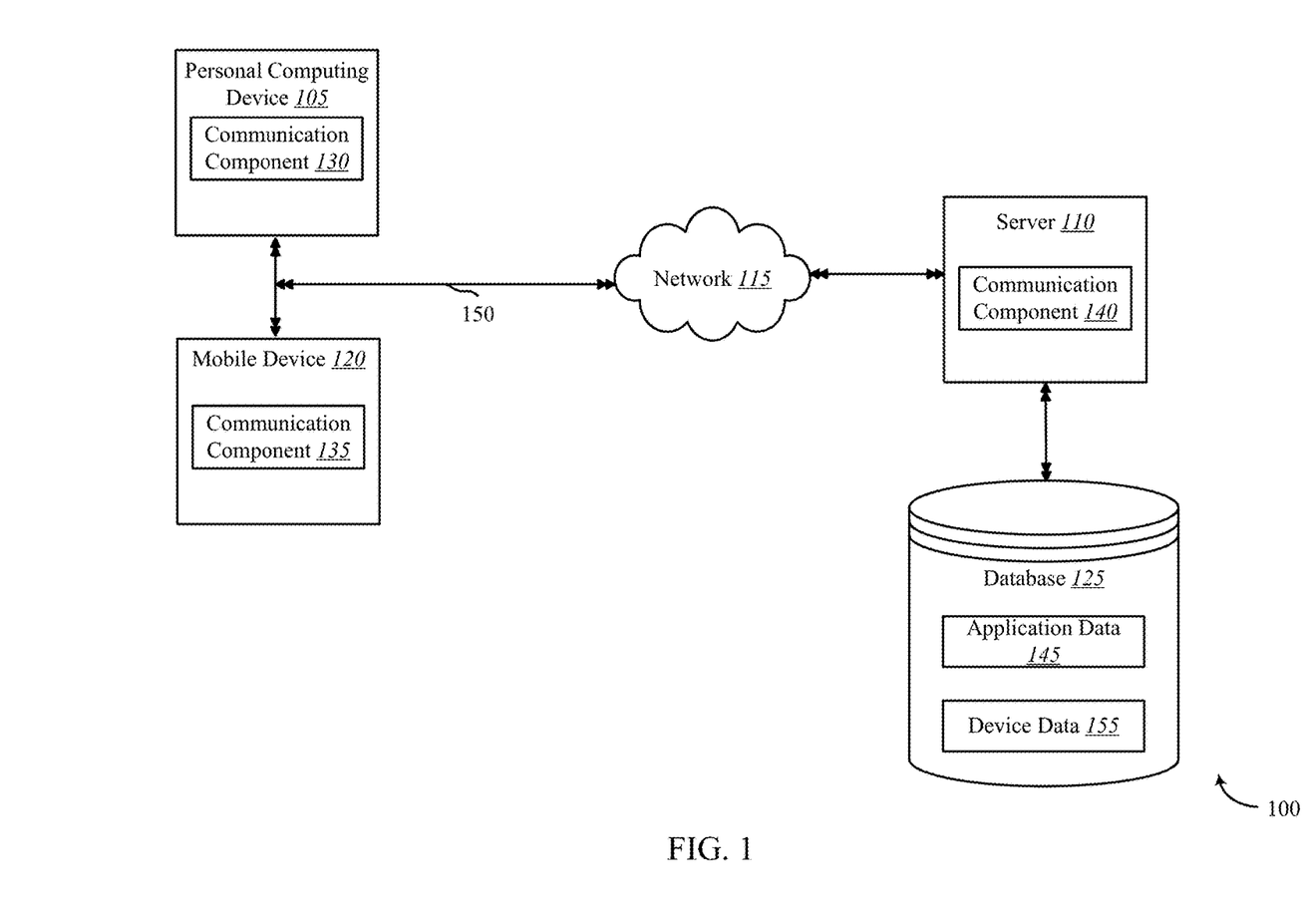
FIG. 1 is a block diagram illustrating embodiments in which the present systems and methods may be implemented, in accordance with various aspects of this disclosure.

FIG. 1 is a block diagram illustrating embodiments in which the present systems and methods may be implemented, in accordance with various aspects of this disclosure. FIG. 1 illustrates an example of a communications system 100 in accordance with various aspects of the disclosure. The communications system 100 may include personal computing device 105, server 110, network 115, mobile device 120, and/or database 125, among other components. The network 115 may provide user authentication, encryption, access authorization, tracking, Internet Protocol (IP) connectivity, and other access, calculation, modification, and/or functions. The personal computing device 105 and the mobile device 120 may interface with the network 115 through a first set of wired and/or wireless communication links 150 to communicate with one or more local and/or remote servers 110.

The personal computing device 105 may include any PC or Mac computer, such as a computer, laptop, desktop, tablet, or the like. Examples of mobile device 120 may include any mobile device or smartphone, including a mobile device operating on a mobile device operating system. In some examples, the mobile device operating system on which the mobile device 120 operates may be the same operating system as that of the personal computing device 105, while in other examples, personal computing device 105 and mobile device 120 may operate on different but compatible operating systems. In some embodiments, the operating system may be a proprietary mobile operating system, such as iOS. In various examples, personal computing device 105 and mobile device 120 may communicate—either directly or indirectly (e.g., through network 115)—with each other over a second set of wired and/or wireless communication links 150. Wired connections may include, in some examples, USB connections, while wireless connections may include, in some examples, Wi-Fi connections. Personal computing device 105 may communicate with a backend server (such as the server 110) directly and/or indirectly using the first set of one or more communication links 150.

In some examples, mobile device 120 may be similar to personal computing device 105. In other examples, mobile device 120 may be different from personal computing device 105. A mobile device 120 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A mobile device 120 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable component and/or element.

The personal computing device 105 may wirelessly communicate with mobile device 120, server 110, database 125, and/or other components via one or more antennas. Personal computing device 105 may provide communication coverage and/or other features for an area. In some examples, personal computing device 105 may be referred to as a control device, a base transceiver station, a radio base station, an access point, a radio transceiver, or some other suitable terminology. The communications system 100 may include personal computing devices 105 of different types. There may be overlapping geographic coverage areas for one or more different parameters, including different technologies, features, subscriber preferences, hardware, software, technology, and/or methods. For example, each personal computing device 105 may be related to one or more discrete structures (e.g., a home, a business) and each of the one more discrete structures may be related to one or more discrete areas. In other examples, multiple personal computing devices 105 may be related to the same one or more discrete structures (e.g., multiple devices relating to a home and/or a business complex).

One or more personal computing device 105 may be dispersed throughout the communications system 100 and each personal computing device 105 may be stationary and/or mobile. A personal computing device 105 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A personal computing device 105 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable component and/or element.

The communication links 150 shown in communications system 100 may include uplink (UL) transmissions from one or more personal computing device 105 to one or more servers 110 and/or mobile device 120, and/or downlink (DL) transmissions, from one or more servers 110 and/or one or more mobile device 120 to one or more personal computing device 105. In some embodiments, a personal computing device 105 and/or mobile device 120 may communicate directly and/or indirectly with database 125 through one or more wired and/or wireless communication links 150. In some embodiments, one or more components may include one or more communication components (e.g., communication component 130, communication component 135, communication component 140, etc.). These communication components may be examples of a network interface card (NIC), among other things. Communication components may facilitate direct and/or indirect wired and/or wireless communication to receive applications, changes, configuration information, some combination, and/or other information.

The downlink transmissions may also be called forward link transmissions while the uplink transmissions may also be called reverse link transmissions. Each of the communication links 150 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 150 may transmit bidirectional communications and/or unidirectional communications. Communication links 150 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, USB, and/or other connection types related to the present systems and methods.

In some embodiments of communications system 100, personal computing device 105 and/or mobile device 120 (among other components) may include one or more antennas for employing antenna diversity schemes to improve communication quality and reliability between personal computing device 105 and mobile device 120 and/or other elements, as an example. Additionally or alternatively, personal computing device 105, mobile device 120, and/or servers 110 (among other components) may employ multiple-input, multiple-output (MIMO) techniques that may take advantage of multi-path, mesh-type environments to transmit multiple spatial layers carrying the same or different coded data.

While personal computing device 105 and/or mobile device 120 may communicate with one or more components through one or more other components (e.g., communicate with database 125 through server 110), personal computing device 105 and/or mobile device 120 may also communicate directly with one or more other components via one or more direct communication links 150. Two or more of personal computing device 105 and/or mobile device 120 may also communicate via a direct communication link 150. Examples of direct communication links 150 may include Wi-Fi Direct, BLUETOOTH®, wired (including USB), and/or other P2P group connections. The personal computing device 105 and/or mobile device 120 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

Personal computing device 105 may attempt to transmit one or more data packages, for example via communication component 130, to mobile device 120 using a wired or wireless communication link 150. Upon detecting the data package transmission attempt, personal computing device 105 may query backend server 110, for example using a wired or wireless communication link 150 via network 115, to determine whether the detected data package is malware. In some examples, server 110 may compare one or more extracted characteristics associated with the data package, as communicated from personal computing device 105 (for example using communication component 135) with a blacklist, whitelist, list of known behaviors, or the like, stored on database 125.

Server 110 may provide information relating to one or more characteristics of the data package directly and/or based on queries and/or communications with database 125. Database 125 may store application data 145 (including, but not limited to, one or more application bundle ID, proprietary .ipa file, certification data, provision profile, or the like) and/or device data 155 (including, but not limited to, one or more reputation, signer, known behavior, whitelist, blacklist, or the like), some combination, and/or other information.

Figure 2:
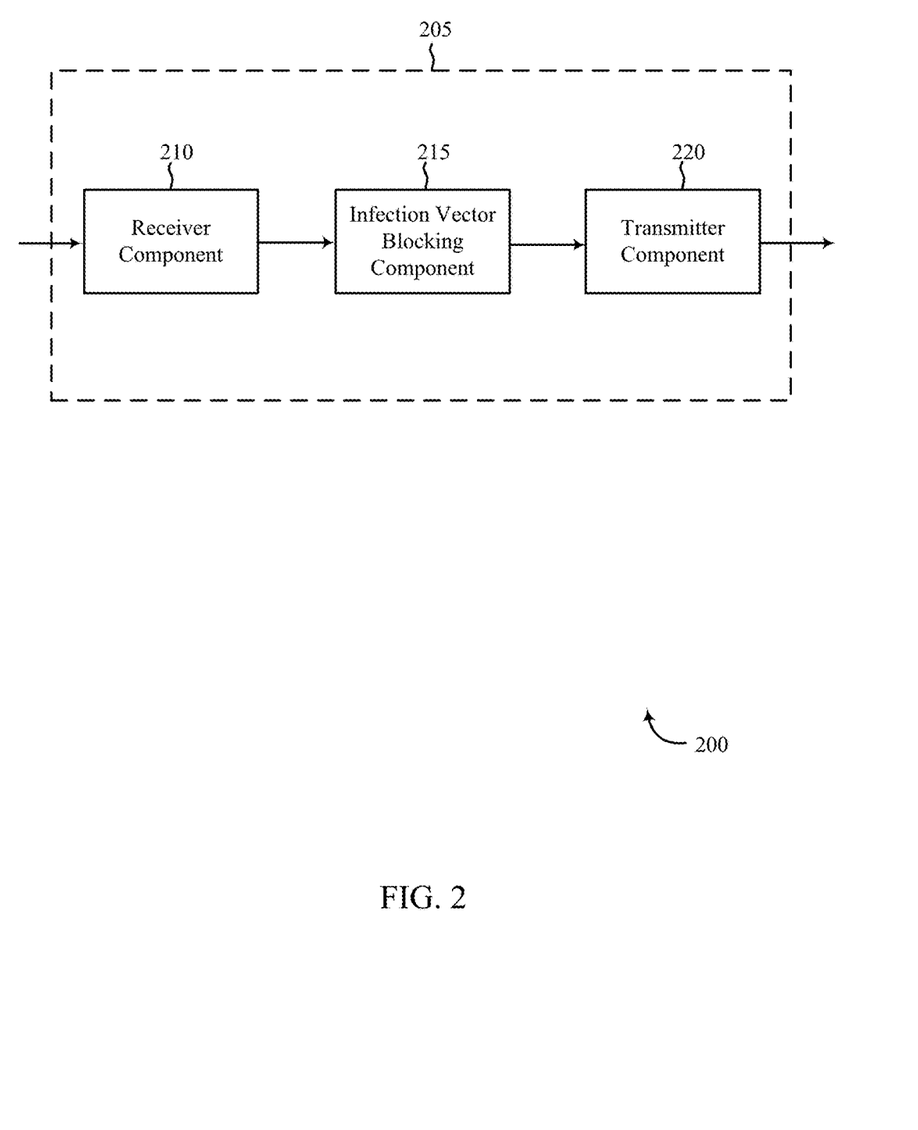
FIG. 2 is a block diagram illustrating embodiments in which the present systems and methods may be implemented, in accordance with various aspects of this disclosure.

FIG. 2 shows a block diagram 200 of a device 205 for use in blocking infection vectors, in accordance with various aspects of this disclosure. The device 205 may be an example of one or more aspects of personal computing device 105 described with reference to FIG. 1, among others. The device 205 may include a receiver component 210, an infection vector blocking component 215, and/or a transmitter component 220. Each of these components may be in communication with each other—directly and/or indirectly.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

The receiver component 210 may receive information such as data packets, user data, and/or control information associated with various information channels (e.g., control channels, data channels, etc.). The receiver component 210 may be configured to receive information associated with communication of data packages, information associated with one or more extracted characteristics of the data packets, and/or other information. Information may be passed on to the infection vector blocking component 215, and to other components of the device 205.

In some embodiments, infection vector blocking component 215 may receive information from receiver component 210 and/or another element of device 205 (such as those discussed with respect to FIG. 1, among others). Infection vector blocking component 215 may perform one or more operations relating to the present system, methods, and techniques relating to blocking infection vectors. Infection vector blocking component 215 may receive information relating to and/or may itself perform operations relating to one or more behaviors associated with device 205 and/or one or more applications, and/or other capabilities, some combination of these, and/or other techniques.

The transmitter component 220 may transmit the one or more signals received from other components of the device 205. The transmitter component 220 may transmit instructions, applications, programs, information, settings, actions, data, some combination, and/or other information to one or more other devices, servers, computing units, databases, some combination, and/or other elements and/or components. In some examples, the transmitter component 220 may be collocated with the receiver component 210 in a transceiver component.

Figure 3:
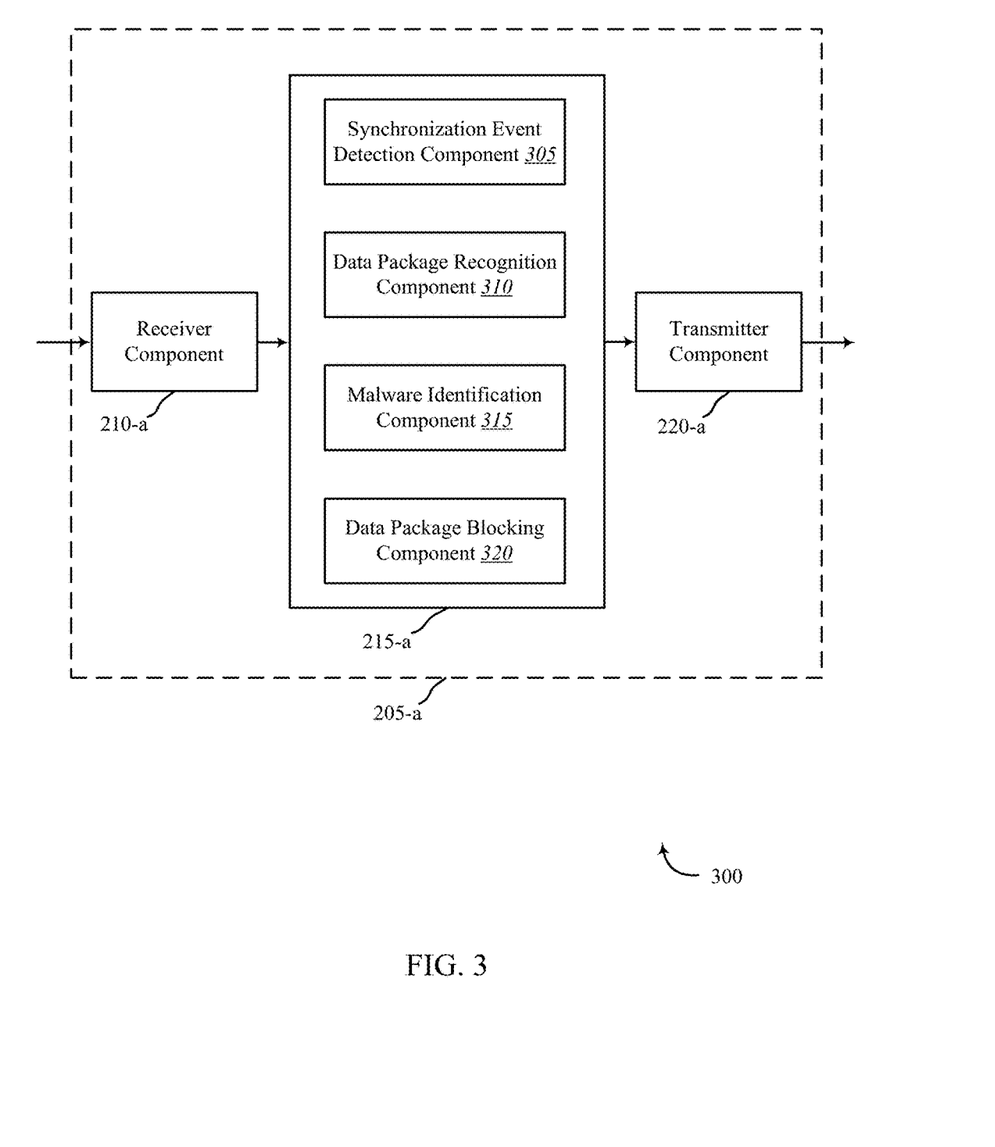
FIG. 3 is a block diagram illustrating embodiments in which the present systems and methods may be implemented, in accordance with various aspects of this disclosure.

FIG. 3 shows a block diagram 300 of a device 205-*a* for use in blocking infection vectors, in accordance with various examples. The device 205-*a* may be an example of one or more aspects of a personal computing device 105, described with reference to FIG. 1, among others. The device 205-*a* may include a receiver component 210-*a*, an infection vector blocking component 215-*a*, and/or a transmitter component 220-*a*, each of which may be examples of the corresponding components of device 205. The device 205-*a* may also include a processor. Each of these components may be in communication with each other and/or other elements. The infection vector blocking component 215-*a* may include a synchronization event detection component 305, a data package recognition component 310, a malware identification component 315, or a data package blocking component 320, or some combination, and/or other components relating to the present systems, methods, and techniques. The receiver component 210-*a* and the transmitter component 220-*a* may perform the functions of the receiver component 210 and the transmitter component 220, of FIG. 2, respectively.

The components of the device 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

In some embodiments, infection vector blocking component 215-*a* may include a synchronization event detection component 305. This synchronization event detection component 305 may be part of infection vector blocking component 215-*a*, may be separate from infection vector blocking component 215-*a*, and/or may work in conjunction with other elements and/or components of device 205-*a*, among others. Synchronization event detection component 305 may perform one or more operations relating to detecting a synchronization event, such as a connection, between device 205-*a* and another device, such as mobile device 120 as described with reference to FIG. 1. For example, synchronization event detection component 305 may identify that device 205-*a* has engaged in a wired, such as USB, or wireless, such as Wi-Fi, connection with a mobile device, for example for the purposes of synchronization of the two devices.

In some embodiments, infection vector blocking component 215-*a* may include a data package recognition component 310. This data package recognition component 310 may be part of infection vector blocking component 215-*a*, may be separate from infection vector blocking component 215-*a*, and/or may work in conjunction with other elements and/or components of device 205-*a*, among others. Data package recognition component 310 may perform one or more operations relating to recognizing an attempt by device 205-*a*, such as a personal computing device 105 as described with respect to FIG. 1, to communicate a data package to a device other than device 205-*a*, such as a mobile device, via the wired or wireless communication link identified by synchronization event detection component 305, among other things. For example, in accordance with various aspects of the present techniques, data package recognition component 310 may recognize that the personal computing device is attempting one or more of a path configuration, or an application installation, or an installation confirmation, or an application removal, or an application dump, or a data backup, or a provision profile installation, or a provision profile removal, or a provision profile list, or any combination thereof.

In some embodiments, infection vector blocking component 215-*a* may include a malware identification component 315. This malware identification component 315 may be part of infection vector blocking component 215-*a*, may be separate from infection vector blocking component 215-*a*, and/or may work in conjunction with other elements and/or components of device 205-*a*, among others. Malware identification component 315 may perform one or more operations relating to detecting malware, among other things. For example, where synchronization event detection component 305 detects a USB connection between the first computing device and the second mobile device, data package recognition component 310 may extract one or more characteristic of the data package attempted to be sent from the first device to the second device via the USB connection. Data package recognition component 310 may communicate the one or more characteristic of the data package to malware identification component 315, which may query a backend server, for example via transmitter component 220-*a*, based at least in part on the extracted one or more characteristic. The backend server may be an example of server 110 as illustrated in FIG. 1. The backend server may compare the extracted one or more characteristics with a database of known characteristics in order to identify the data package as malware. Based on this comparison, malware identification component 315 may identify the data package as malware. In other examples, where synchronization event detection component 305 detects a Wi-Fi connection between the first computing device and the second mobile device, data package recognition component 310 may extract one or more characteristic of the data package attempted to be sent from the first device to the second device via the Wi-Fi connection. Data package recognition component 310 may compare the extracted one or more characteristics with a database of known characteristics in order to identify the data package as malware. Based on this comparison, malware identification component 315 may identify the data package as malware.

In some embodiments, infection vector blocking component 215-*a* may include a data package blocking component 320. This data package blocking component 320 may be part of infection vector blocking component 215-*a*, may be separate from infection vector blocking component 215-*a*, and/or may work in conjunction with other elements and/or components of device 205-*a*, among others. Data package blocking component 320 may perform one or more operations relating to blocking a data package identified as malware, among other things. For example, malware identification component 315 may identify the data package attempted to be communicated from the first personal computing device to the second mobile device via the wired or wireless connection as malware. On the basis of this determination, data package blocking component 320 may block the receipt of the data package at the second mobile device, and prevent that data package from being installed on the second mobile device.

Figure 4:
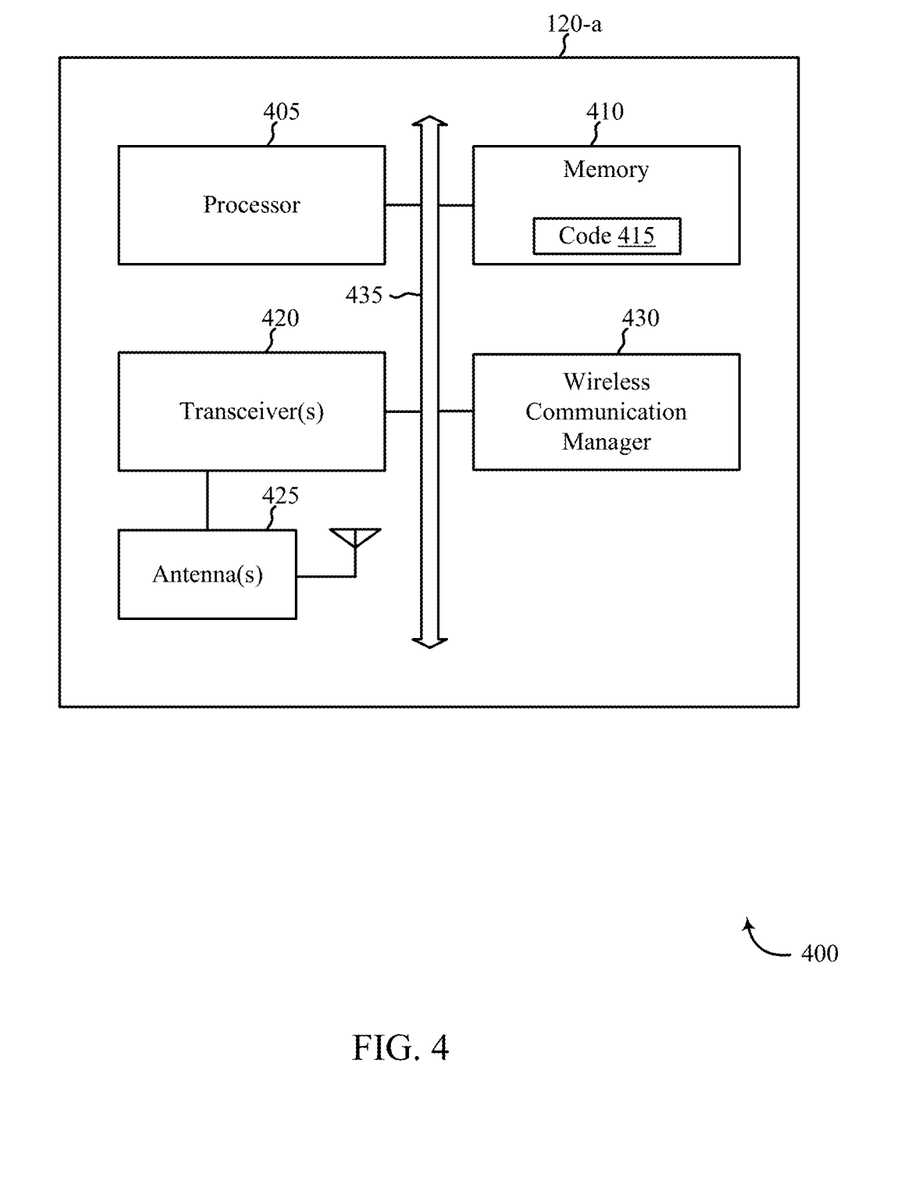
FIG. 4 is a block diagram illustrating embodiments in which the present systems and methods may be implemented, in accordance with various aspects of this disclosure.

FIG. 4 shows a block diagram 200 of a mobile device 120-*a* for use in wireless communication, in accordance with various aspects of the present disclosure. The mobile device 120-*a* may be included or be part of a personal computer (e.g., a laptop computer, a netbook computer, a tablet computer, etc.), a cellular telephone, a PDA, a DVR, an internet appliance, a gaming console, an e-reader, a vehicle, an Internet of Things (IoT) device, a home appliance, a lighting or alarm control system, etc. The mobile device 120-*a* may, in some examples, have an internal power supply (not shown), such as a small battery, to facilitate mobile operation. In some examples, the mobile device 120-*a* may be an example of aspects of one or more of the mobile device 120 described with reference to FIG. 1.

The mobile device 120-*a* may include a processor 405, a memory 410, at least one transceiver (represented by transceiver(s) 420), at least one antenna (represented by antenna(s) 425), or a wireless communication manager 430. Each of these components may be in communication with each other, directly or indirectly, over one or more buses 435.

The memory 410 may include random access memory (RAM) or read-only memory (ROM). The memory 410 may store computer-readable, computer-executable code 415 containing instructions that are configured to, when executed, cause the processor 405 to perform various functions described herein related to proactively blocking infection vectors. Alternatively, the computer-executable code 415 may not be directly executable by the processor 405 but may be configured to cause the mobile device 120-*a* (e.g., when compiled and executed) to perform various of the functions described herein.

The processor 405 may include an intelligent hardware device, e.g., a central processing unit (CPU), a microcontroller, an ASIC, etc. The processor 405 may process information received through the transceiver(s) 420 or information to be sent to the transceiver(s) 420 for transmission through the antenna(s) 425. The processor 405 may handle, alone or in connection with the wireless communication manager 430, various aspects of communicating over (or managing communications over) one or more radio frequency spectrum bands.

The transceiver(s) 420 may include a modem configured to modulate packets and provide the modulated packets to the antenna(s) 425 for transmission, and to demodulate packets received from the antenna(s) 425. The transceiver(s) 420 may, in some examples, be implemented as one or more transmitters and one or more separate receivers. The transceiver(s) 420 may support communications in one or more radio frequency spectrum bands. The transceiver(s) 420 may be configured to communicate bi-directionally, via the antenna(s) 425, with one or more of the servers 110 described with reference to FIG. 1. While the mobile device 120-a may include a single antenna, there may be examples in which the mobile device 120-a may include multiple antennas 425.

The wireless communication manager 430 may be configured to perform or control some or all of the device techniques or functions described with reference to FIG. 1 related to proactively identifying and blocking infection vectors. The wireless communication manager 430, or portions of it, may include a processor, or some or all of the functions of the wireless communication manager 430 may be performed by the processor 405 or in connection with the processor 405.

In some embodiments, one of ordinary skill in the art will appreciate various other aspects and/or method of virtualization can be employed in light of and in conjunction with the present systems, methods, and techniques of this disclosure, including, but not limited to, techniques and/or practices of and/or relating to detecting potential malware and/or other methods.

Figure 5:
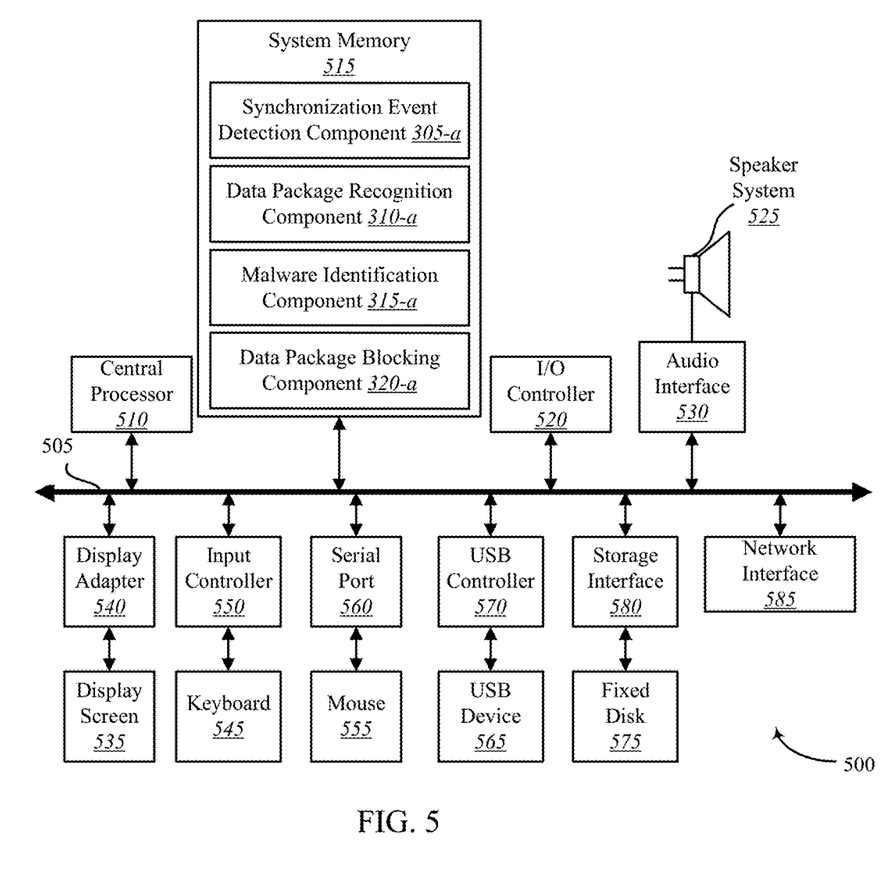
FIG. 5 is a block diagram illustrating embodiments of a system suitable for implementing embodiments of the present systems and methods, in accordance with various aspects of this disclosure.

FIG. 5 depicts a block diagram of a device controller 500 suitable for implementing the present systems and methods. The device controller 500 may be an example of a device, a server, a computing unit, and/or other units. In some examples, device controller 500 may be an example of personal computing device 105 described with respect to FIG. 1. In some embodiments, device controller 500 includes a bus 505 which interconnects components and/or elements of device controller 500 including one or more of: a central processor 510, a system memory 515 (which may include random access memory (RAM), read-only memory (ROM), flash RAM, and/or similar memory), an input/output controller 520, an external audio device, such as a speaker system 525 via an audio output interface 530, an external device, such as a display screen 535 via display adapter 540, an input device 545 (e.g., remote control device interfaced with an input controller 550), a USB device 565 (in some cases interfaced with a USB controller 570), and a storage interface 580. Also included are at least one sensor 555 connected to bus 505 through a sensor controller 560 and a network interface 585 (in some cases coupled directly to bus 505).

Bus 505 allows data communication between central processor 510, system memory 515 (which may include ROM, flash memory, RAM, and/or similar memory, as previously noted), and/or other elements. One type of memory, such as RAM, may be the main memory into which the operating system and application programs are loaded. The ROM and/or the flash memory can contain, among other code, the Basic Input-Output system (BIOS) that controls basic hardware operation such as the interaction with peripheral components or devices. For example, the different components (e.g., communication, identification, modification, generation, determination, analysis, feedback, and/or others) to implement the present systems and methods may be stored within the system memory 515. Applications resident with device controller 500 are generally stored on and accessed via a non-transitory computer readable medium, such as a hard disk drive (e.g., fixed disk 575) and/or other storage medium. Additionally, applications can be in the form of electronic signals modulated in accordance with the application and data communication technology when accessed via network interface 585.

In some examples, system memory 515 may include one or more of a synchronization event detection component 305-a, a data package recognition component 310-a, a malware identification component 315-a, and/or a data package blocking component 320-a, each of which may be examples of the corresponding components as described with reference to FIG. 3.

Storage interface 580, as with the other storage interfaces of device controller 500, can connect to a standard computer readable medium for storage and/or retrieval of information—such as a fixed disk 575. Fixed disk 575 may be a part of device controller 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like. In some embodiments, one or more sensors (e.g., device sensors, network sensors, system sensors, authentication sensors, communication sensors, and/or power sensors, etc.) connect to device controller 500 wirelessly via network interface 585.

Many other devices or subsystems may be connected in a similar manner (e.g., computing device, remote devices, transmitters, etc.). In addition, all of the devices shown in FIG. 5 need not be present to practice the disclosed systems and methods. The devices and subsystems can be interconnected in different ways from that shown in FIG. 5. Some aspects of some operations of a system, such as that shown in FIG. 5, may be readily known in the art and are not discussed in detail in this application.

Code to implement the present disclosure can be stored in a non-transitory computer-readable medium such as one or more of system memory 515 or fixed disk 575. The operating system(s) provided on device controller 500 may be iOS®, ANDROID®, MS-DOS®, MS-WINDOWS®, OS/2®, UNIX®, LINUX®, and/or another operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments may be characterized as communicated from one block to the next, other embodiments of the present systems and methods may include modified signals in place of such directly communicated signals as long as the informational and/or functional aspect of the signal is communicated between blocks. To some extent, a signal input at a second block can be conceptualized as a second signal derived from a first signal output from a first block due to physical limitations of the circuitry involved (e.g., there will inevitably be some attenuation and delay). Therefore, as used here, a second signal derived from a first signal includes the first signal and/or any modifications to the first signal—whether due to circuit limitations or due to passage through other circuit elements which do not change the informational and/or final functional aspect of the first signal.

Figure 6:
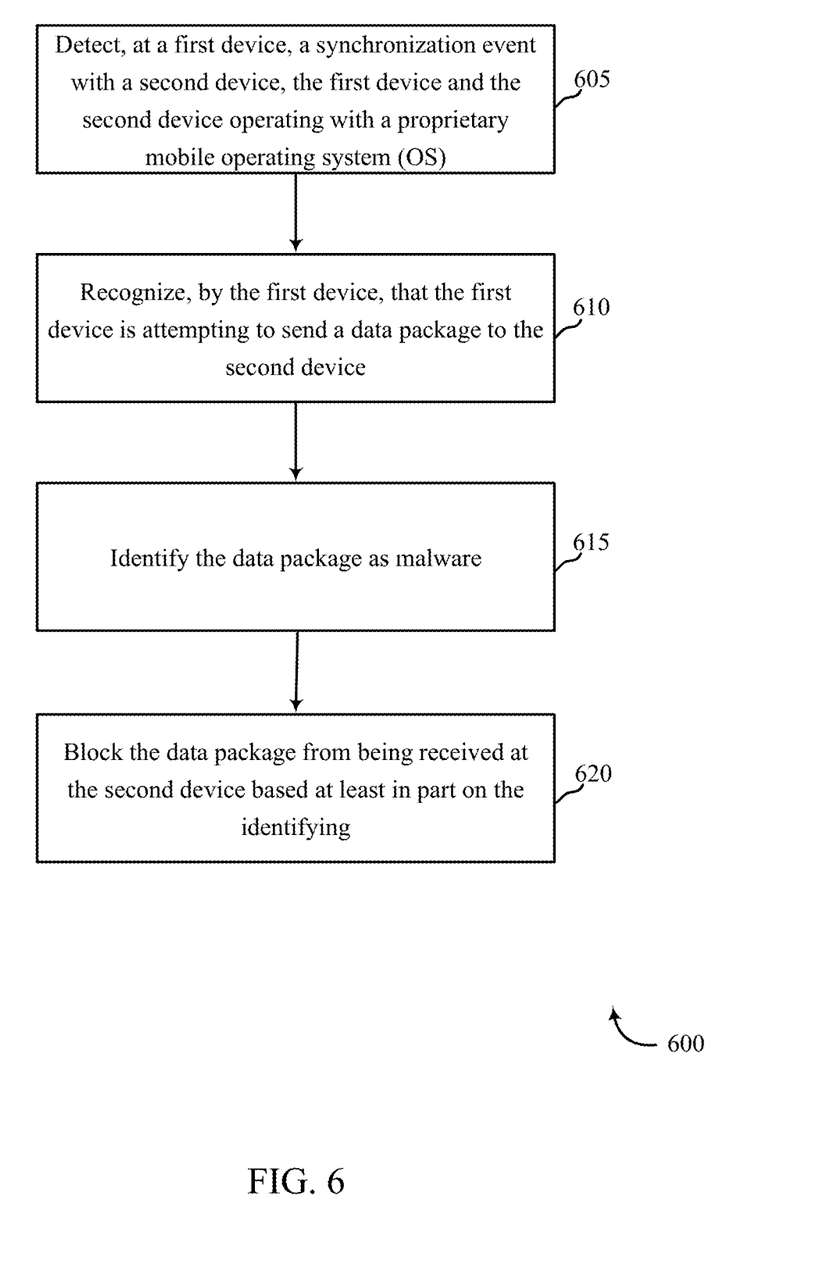
FIG. 6 is a flow chart illustrating embodiments of methods and techniques relating to blocking an infection vector, in accordance with various aspects of this disclosure.

FIG. 6 is a flow chart illustrating an example of a method 600 for blocking infection vectors, in accordance with various aspects of the present disclosure. For clarity, the method 600 is described below with reference to aspects of one or more of the personal computing device 105, mobile device 120, 120-a, and/or device 205, 205-a described with reference to FIGS. 1-4 (among others), and/or aspects of one or more of the infection vector blocking component 215, 215-a (among others) described with reference to FIGS. 3 and 4. In some embodiments, a device may execute one or more sets of codes to control the functional elements of the device to perform the functions described below. Additionally or alternatively, a server, a device, and/or a computing unit may perform one or more of the functions described below using special-purpose hardware.

At block 605, the method 600 may include detecting, at a first device, a synchronization event with a second device, the first device and the second device operating with a proprietary mobile operating system (OS). At block 610, the method 600 may include recognizing, by the first device, that the first device is attempting to send a data package to the second device. At block 615, the method 600 may include identifying the data package as malware. At block 620, the method 600 may include blocking the data package from being received at the second device based at least in part on the identifying.

In some embodiments, the operations at each of blocks 605-620 may be performed using the infection vector blocking component 215 and/or 215-a described with reference to FIGS. 3 and 4, among others.

Thus, the method 600 may provide for identifying and blocking infection vectors sent from a personal computing device to a mobile device via a USB or Wi-Fi connection. It should be noted that the method 600 is just one implementation and that the operations of the method 600 may be rearranged, omitted, and/or otherwise modified such that other implementations are possible.

Figure 7:
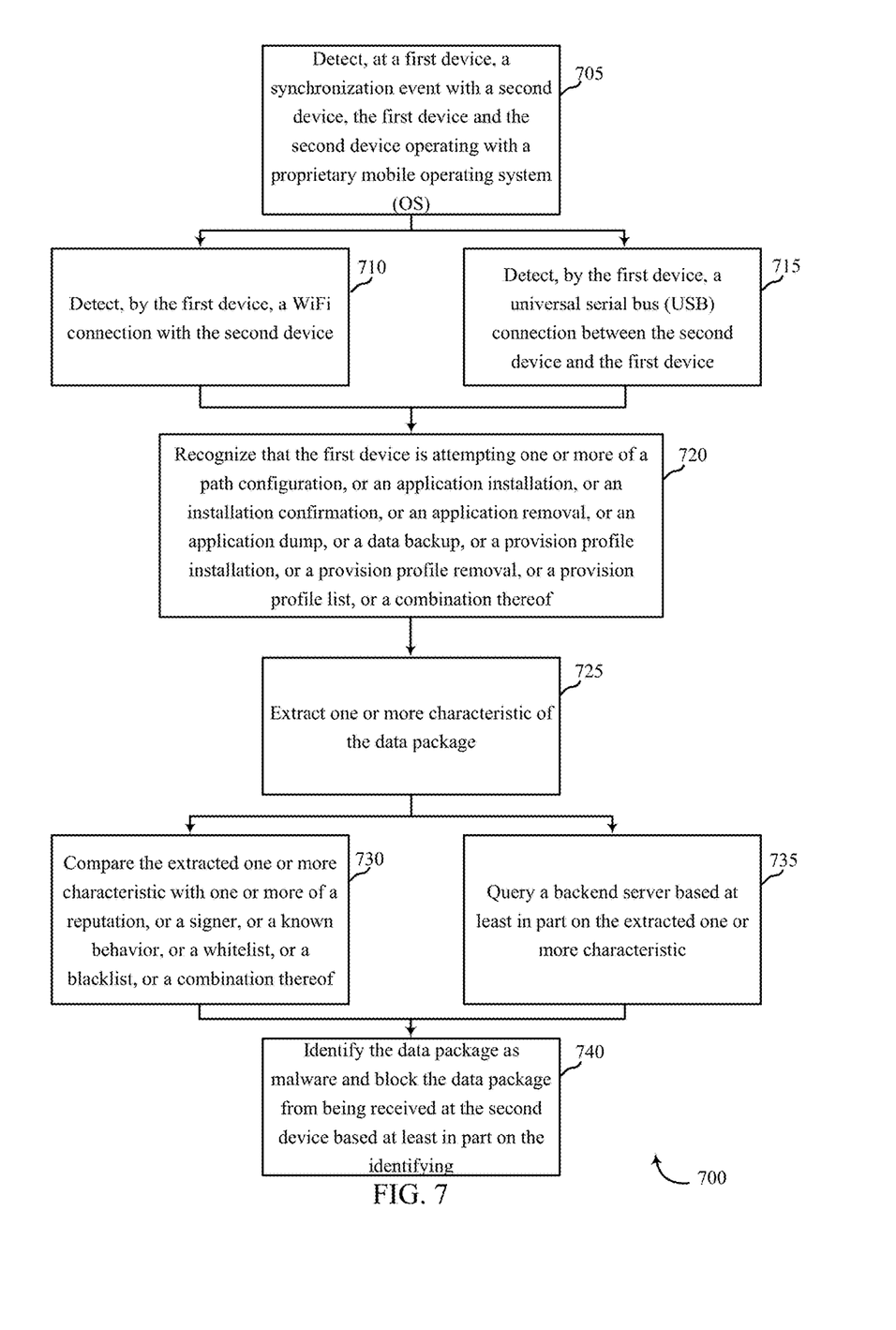
FIG. 7 is a flow chart illustrating embodiments of methods and techniques relating to blocking an infection vector, in accordance with various aspects of this disclosure.

FIG. 7 is a flow chart illustrating an example of a method 700 for blocking an infection vector, in accordance with various aspects of the present disclosure. For clarity, the method 600 is described below with reference to aspects of one or more of the personal computing device 105, mobile device 120, 120-a, and/or device 205, 205-a described with reference to FIGS. 1-4 (among others), and/or aspects of one or more of the infection vector blocking component 215, 215-a (among others) described with reference to FIGS. 3 and 4. In some embodiments, a device may execute one or more sets of codes to control the functional elements of the device to perform the functions described below. Additionally or alternatively, a server, a device, and/or a computing unit may perform one or more of the functions described below using special-purpose hardware.

At block 705, the method 700 may include detecting, at a first device, a synchronization event with a second device, the first device and the second device operating with a proprietary mobile operating system (OS). At block 710, the method 700 may include detecting, by the first device, a Wi-Fi connection with the second device. At block 715, the method 700 may include detecting, by the first device, a universal serial bus (USB) connection between the second device and the first device. At block 720, the method 700 may include recognizing, by the first device, that the first device is attempting to send a data package to the second device by recognizing that the first device is attempting one or more of a path configuration, or an application installation, or an installation confirmation, or an application removal, or an application dump, or a data backup, or a provision profile removal, or a provision profile list, or a combination thereof. At block 725, the method may include extracting one or more characteristic of the data package or one or more characteristic of a process by which the first device is attempting to send the data package to the second device. At block 730, the method 700 may include comparing the extracted one or more characteristic with one or more of a reputation, or a signer, or a known behavior, or a whitelist, or a blacklist, or a combination thereof. At block 735, the method 700 may include querying a backend server based at least in part on the extracted one or more characteristic. At block 740, the method 700 may include identifying the data package as malware and blocking the data package from being received at the second device based at least in part on the identifying.

In some embodiments, the operations at each of blocks 705-740 may be performed using the infection vector blocking component 215 and/or 215-a described with reference to FIGS. 3 and 4, among others.

Thus, the method 700 may provide for blocking infection vectors by identifying data packages sent from a PC/Mac to a mobile device over a Wi-Fi or USB connection as malware, and blocking receipt of the malicious data packages at the mobile device. It should be noted that the method 700 is just one implementation and that the operations of the method 700 may be rearranged, omitted, and/or otherwise modified such that other implementations are possible.

In some examples, aspects from one or more of the methods 600 and 700 (among others) may be combined and/or separated. It should be noted that the methods 600, 700, etc. are just example implementations, and that the operations of the methods 600, 700, etc. may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for blocking an infection vector, comprising:
   detecting, at a first device, a synchronization event with a second device, the first device and the second device operating with a proprietary mobile operating system (OS);
   recognizing, by the first device, that the first device is attempting to send a data package to the second device;
   upon the recognition, extracting, by the first device, one or more characteristics from the data package where the extracted one or more characteristic of the data package comprises: a proprietary mobile operating system application archive (.ipa) file, or certification data, or a provision profile, or a combination thereof;
   identifying, by the first device, the data package as malware based at least in part on the one or more extracted characteristics, wherein identifying the data package as malware comprises querying a backend server based at least in part on the extracted one or more characteristics; and blocking, by the first device, the data package from being received at the second device to protect the second device from the malware.

2. The method of claim 1, wherein detecting the synchronization event comprises:
   detecting a universal serial bus (USB) connection between the first device and the second device.

3. The method of claim 1, wherein detecting the synchronization event comprises:
   detecting, by the first device, a Wi-Fi connection with the second device.

4. The method of claim 1, wherein identifying the data package as malware comprises:
   extracting one or more characteristic of a process by which the first device is attempting to send the data package to the second device; and
   comparing the extracted one or more characteristic with one or more of a reputation, or a signer, or a known behavior, or a whitelist, or a blacklist, or a combination thereof.

5. The method of claim 1, wherein the first device comprises a computing device and the second device comprises a mobile device.

6. The method of claim 1, wherein recognizing that the first device is attempting to send the data package to the second device comprises:
   recognizing that the first device is attempting one or more of a path configuration, or an application installation, or an installation confirmation, or an application removal, or an application dump, or a data backup, or a provision profile installation, or a provision profile removal, or a provision profile list, or a combination thereof.

7. An apparatus for blocking an infection vector, comprising:
   a processor;
   a memory in electronic communication with the processor, wherein the memory stores computer readable executable instructions that when executed by the processor cause the processor to:
   detect, at a first device, a synchronization event with a second device, the first device and the second device operating with a proprietary mobile operating system (OS);
   recognize, by the first device, that the first device is attempting to send a data package to the second device;
   upon the recognition, extract, by the first device, one or more characteristics from the data package where the extracted one or more characteristic of the data package comprises: a proprietary mobile operating system application archive (.ipa) file, or certification data, or a provision profile, or a combination thereof;
   identify, by the first device, the data package as malware based at least in part on the one or more extracted characteristics, wherein identifying the data package as malware comprises querying a backend server based at least in part on the extracted one or more characteristics; and
   block, by the first device, the data package from being received at the second device to protect the second device from the malware.

8. The apparatus of claim 7, wherein the instructions to detect the synchronization event are further executable by the processor to:
   detecting a universal serial bus (USB) connection between the first device and the second device.

9. The apparatus of claim 7, wherein the instructions to detect the synchronization event are further executable by the processor to:
   detect, by the first device, a Wi-Fi connection with the second device.

10. The apparatus of claim 7, wherein the instructions to identify the data package as malware are further executable by the processor to:
    extract one or more characteristic of a process by which the first device is attempting to send the data package to the second device; and
    compare the extracted one or more characteristic with one or more of a reputation, or a signer, or a known behavior, or a whitelist, or a blacklist, or a combination thereof.

11. The apparatus of claim 7, wherein the first device comprises a computing device and the second device comprises a mobile device.

12. The apparatus of claim 7, wherein the instructions to recognize that the first device is attempting to send the data package to the second device are further executable by the processor to:
    recognize that the first device is attempting one or more of a path configuration, or an application installation, or an installation confirmation, or an application removal, or an application dump, or a data backup, or a provision profile installation, or a provision profile removal, or a provision profile list, or a combination thereof.

13. A non-transitory computer-readable medium storing code for security and/or automation systems, the code comprising instructions executable to:
    detect, at a first device, a synchronization event with a second device, the first device and the second device operating with a proprietary mobile operating system (OS);
    recognize, by the first device, that the first device is attempting to send a data package to the second device;
    upon the recognition, extract, by the first device, one or more characteristics from the data package where the extracted one or more characteristic of the data package comprises: a proprietary mobile operating system application archive (.ipa) file, or certification data, or a provision profile, or a combination thereof;
    identify, by the first device, the data package as malware based at least in part on the one or more extracted characteristics, wherein identifying the data package as malware comprises querying a backend server based at least in part on the extracted one or more characteristics; and
    block, by the first device, the data package from being received at the second device to protect the second device from the malware.

14. The non-transitory computer-readable medium of claim 13, wherein the instructions to detect the synchronization event are further executable to:
    detecting a universal serial bus (USB) connection between the first device and the second device.

15. The non-transitory computer-readable medium of claim 13, wherein the instructions to detect the synchronization event are further executable to:
    detect, by the first device, a Wi-Fi connection with the second device.

16. The non-transitory computer-readable medium of claim 13, wherein the instructions to recognize that the first device is attempting to send the data package to the second device are further executable by the processor to:

recognize that the first device is attempting one or more of a path configuration, or an application installation, or an installation confirmation, or an application removal, or an application dump, or a data backup, or a provision profile installation, or a provision profile removal, or a provision profile list, or a combination thereof.

\* \* \* \* \*